(12) United States Patent
Qin et al.

(10) Patent No.: US 6,356,857 B1  
(45) Date of Patent: Mar. 12, 2002

(54) SENSOR VALIDATION APPARATUS AND METHOD

(75) Inventors: S. Joe Qin, Austin, TX (US); John P. Guiver, Pittsburgh, PA (US)

(73) Assignee: Aspen Technology, Inc., Cambridge, MA (US)

(*) Notice: Subject to any disclaimer, the term of this patent is extended or adjusted under 35 U.S.C. 154(b) by 0 days.

(21) Appl. No.: 09/179,343

(22) Filed: Oct. 27, 1998

Related U.S. Application Data
(60) Provisional application No. 60/096,872, filed on Aug. 17, 1998.

(51) Int. Cl.⁷ ............................. G06F 11/30; G06F 15/00

(52) U.S. Cl. ............................................. 702/185; 714/746

(58) Field of Search ........................... 702/185, 145; 714/736, 798, 799, 25, 704, 746

(56) References Cited

U.S. PATENT DOCUMENTS

| | | | |
|---|---|---|---|
| 4,644,479 A | * 2/1987 | Kemper et al. | 702/185 |
| 4,761,748 A | * 8/1988 | Le Rat et al. | 714/822 |
| 4,772,445 A | 9/1988 | Nasrallah et al. | 376/245 |
| 5,386,373 A | 1/1995 | Keeler et al. | 364/577 |
| 5,442,562 A | 8/1995 | Hopkins et al. | 364/468 |
| 5,459,675 A | 10/1995 | Gross et al. | 364/492 |
| 5,469,447 A | 11/1995 | Brunemann, Jr. et al. | 371/36 |
| 5,548,528 A | 8/1996 | Keeler et al. | 364/497 |
| 5,548,597 A | * 8/1996 | Kayama et al. | 714/736 |
| 5,570,300 A | * 10/1996 | Henry et al. | 702/45 |
| 5,586,066 A | 12/1996 | White et al. | 364/576 |
| 5,629,872 A | 5/1997 | Gross et al. | 364/554 |
| 5,661,735 A | 8/1997 | Fischer | 371/49.1 |
| 5,680,409 A | 10/1997 | Qin et al. | 371/48 |
| 5,761,090 A | 6/1998 | Gross et al. | 364/551.01 |
| 6,108,616 A | * 8/2000 | Borchers et al. | 702/183 |

FOREIGN PATENT DOCUMENTS

| | | |
|---|---|---|
| DE | 41 00 501 A1 | 7/1992 |
| EP | 0 416 370 A2 | 8/1990 |

OTHER PUBLICATIONS

Kramer, M.A., "Nonlinear Principal Component Analysis Using Autoassociative Neural Networks," *AIChE Journal* 37:2, pp. 233–243 (1991).

Qin, S.J. and Dunia, R., "Determining the Number of Principal Components for Best Reconstruction," *Proc. 5th IFAC Symposium on Dynamics and Control of Process Systems*, pp. 359–364, Corfu, Greece (Jun. 8–10, 1998).

Gertler, J. and Singer, D., "A New Structural Framework for Parity Equation–based Failure Detection and Isolation," *Automatica* 26:381–388 (1990).

Martens, H. and Naes, T., "Multivariate Calibration," John Wiley and Sons, table of contents p. vii–xiii and p. 158 (1989).

(List continued on next page.)

Primary Examiner—Hal Wachsman  
Assistant Examiner—Demetrius Pretlow  
(74) Attorney, Agent, or Firm—Hamilton, Brook, Smith & Reynolds, P.C.

(57) ABSTRACT

An apparatus and method is disclosed for detecting, identifying, and classifying faults occurring in sensors measuring a process. If faults are identified in one or more sensors, the apparatus and method provide replacement values for the faulty sensors so that any process controllers and process monitoring systems that use these sensors can remain in operation during the fault period. The identification of faulty sensors is achieved through the use of a set of structured residual transforms that are uniquely designed to be insensitive to specific subsets of sensors, while being maximally sensitive to sensors not in the subset. Identified faults are classified into one of the types Complete Failure, Bias, Drift, Precision Loss, or Unknown.

68 Claims, 9 Drawing Sheets

OTHER PUBLICATIONS

Jackson, J. Edward, "A User's Guide to Principal Components," John Wiley and Sons, Inc., table of contents pp. vii–xiii (1991).

Gertler, J. et al., "Isolation Enhanced Principal Component Analysis," *Proc. IFAC Workshop on On–line Fault Detection and Supervision in the Chemical Process Industries*, Institute Francais du Petrole, Solaize (Lyon) France (Jun. 4–5, 1998).

Gertler, J. and Singer, D., "Augmented Models for Statistical Fault Isolation in Complex Dynamic Systems," *Proc. American Control Conference*, pp. 317–322 (1985).

Benveniste, A. et al., "The Asymptotic Local Approach to Change Detection and Model Validation," *IEEE Trans. Auto. Cont.* AC32 (7):583–592 (Jul. 1987).

Birkes, D. and Dodge, Y., "Alternative Methods of Regression," John Wiley & Sons, Inc., table of contents and chapter 3, pp. 29–55 (1993).

Gertler, J., "Survey of Model–Based Failure Detection and Isolation in Complex Plants," *IEEE Control Systems Magazine*, pp. 3–11 (Dec. 1988).

Jackson, E.J. and Mudholkar, G.S., "Control Procedures for Residuals Associated with Principal Component Analysis," *Technometrics 21* (3): 341–349 (Aug. 1979).

Miller, P. et al., "Contribution Plots: A Missing Link in Multivariate Quality Control," (Apr. 4, 1994).

\* cited by examiner

SENSOR VALIDATION APPARATUS AND METHOD

RELATED APPLICATION

This application claims the benefit of U.S. Provisional Application No. 60/096,872 filed Aug. 17, 1998, the contents of which are incorporated herein by reference in their entirety.

FIELD OF THE INVENTION

The present invention pertains, in general, to process controllers and process monitoring systems that make use of sensors for measuring process variables. In particular it relates to a system that detects and identifies one or more sensor faults, classifies the types of sensor fault, and replaces erroneous sensor values with estimates of the correct process variable values.

BACKGROUND OF THE INVENTION

Sensor validation is an important step for many model based applications in the process industries. Typical model based applications include model predictive control applications (MPC), and inferential sensing applications in which costly or infrequent measurements, available from laboratory samples or hardware analyzers, are replaced by regularly available inferred values from the model.

In a typical MPC application, steady state optimization is performed to find the optimal target values for the controlled and manipulated variables. If the sensors are faulty, the optimized target values are not valid. Therefore, an effective sensor validation approach that detects and identifies faulty sensors on-line is required. Once a faulty sensor is identified, it is desirable to estimate the fault magnitude and replace it with the best reconstruction in order to maintain the control system on-line even though a sensor has failed.

A typical inferential sensor application is in the area of predictive emissions monitoring systems (PEMS). Federal and/or state regulations may require air-polluting plants to monitor their emissions such as nitrogen oxides ($NO_x$), oxygen ($O_2$), and carbon monoxide (CO). Hardware continuous emissions monitoring systems (CEMS) have both a high initial cost and a high maintenance cost. CEMS can be replaced by PEMS provided the PEMS is shown to be sufficiently accurate and reliable. One of the quality assurance requirements for PEMS is that each sensor that is used in the PEMS model be monitored for failure, and have a strategy for dealing with sensor failure so as to minimize down-time.

The term sensor validation refers, for this patent application, to multivariate model based sensor validation. This is an approach which makes use of redundancy in the plant measurements. Typically sensor measurements exhibit a correlation structure which can be established by a training procedure using collected or historian data. This correlation structure can be monitored online; when the correlation structure is broken a possible sensor fault has occured. However the breaking of this correlation structure could also be due to process upset, process transition, or some other reason unrelated to sensor fault. The main objective is to determine if this really is a sensor fault and, if so, to identify the offending sensor. The various phases of sensor validation can be summarized as:

Detection
  This phase detects a change in the correlation structure; it may or may not be a sensor fault.

Identification
  This phase determines if this is a sensor fault and identifies the particular sensor.

Estimation
  This phase estimates the size of the fault which allows reconstruction of the true value and replacement of the faulty value.

Classification
  This phase classifies the type of sensor fault—complete failure, bias, drift, or precision loss.

Depending on the particular approach, these phases may overlap. There have been several patents granted that address the topic of multivariate model based sensor validation. The key ones are:

Qin et al. U.S. Pat. No. 5,680,409 "Method and Apparatus for detecting and identifying faulty sensors in a process".

Keeler et al. U.S. Pat. No. 5,548,528 "Virtual Continuous Emission Monitoring System".

Hopkins et al. U.S. Pat. No. 5,442,562 "Method of contolling a manufacturing process using multivariate analysis".

Qin et al. address sensor validation within the context of process control. The preferred embodiment is based on PCA (Principal Components Analysis) and performs identification through an optimal reconstruction procedure: each sensor value is reconstructed on the assumption it is at fault, then identification and classification is done by tracking indices derived from the reconstruction error.

Keeler et al. address sensor validation explicitly within the context of PEMS. The disclosed system focuses on the inferential sensor technology and the use of neural networks for PEMS. The sensor validation technology uses a sub-optimal reconstruction procedure for identification, does not address classification, and makes use of an "encoder" neural network which is a non-linear version of PCA. Encoder networks are also described in Mark Kramer "Nonlinear principal component analysis using autoassociative neural networks", *AIChE Journal*, 37 (2), pp. 233–243 (1991).

Hopkins et al. address sensor validation within the context of process monitoring (multivariate statistical process control), and make use of PCA or PLS (Partial Least Squares). Identification is by means of contribution analysis. Detection is achieved by monitoring principal component "scores" or score statistics and comparing with standard confidence intervals. Identfication is by examining the contributions of each original measurement to the offending score. The method does not attempt to classify fault types.

SUMMARY OF THE INVENTION

The present invention provides a new apparatus and method for the detection, identification, estimation, reconstruction, and classification of faulty sensors. The approach makes use of a normal process model that can be built from first principles or from data using statistical methods such as partial least squares (PLS) or principal component analysis. In the preferred embodiment, the process model is based on a PCA model in which the number of principal components is chosen to optimize the reconstruction of faulty sensor values as described in Qin and Dunia "Determining the number of principal components for best reconstruction", *Proc. of the 5-th IFAC Symposium on Dynamics and Control of Process Systems*, 359–364, Corfu, Greece, Jun. 8–10, 1998.

The detection phase uses a detection index based on the model equation error. An exponentially weighted moving average (EWMA) filter is applied to the detection index to reduce false alarms due to temporary transients. The filtered detection index (FDI) is compared to a statistically derived threshold in order to detect possible faults. Detection of a possible fault condition triggers the identification phase of the invention.

The key component of this invention is the identification phase. To determine whether a detection alarm is due to one or more faulty sensors, and to identify the offending sensor (s), a series of detectors are constructed which are insensitive to one subset of faults but most sensitive to the others. These detectors are based on structured residuals (SRs) constructed by means of a novel approach referred to a structured residual approach with maximized sensitivity (SRAMS). Structured residuals are generally described in Gertler and Singer, "A new structural framework for parity equation based failure detection and isolation", *Automatica* 26:381–388, 1990. An exponentially weighted moving average (EWMA) filter is applied to the SRs to reduce false alarms due to temporary transients. The SRs are also squared and normalized so as to equitably compare different SRs. Identification is achieved by comparing these normalized squared filtered structured residuals (NSFSRs) to statistically inferred confidence limits. In addition to NSFSRs, indices based on the accumulation of the normalized structured residuals (NSRs) from the time of detection are monitored and compared for use in the identification of faulty sensors. Two such indices are the generalized likelihood ratio (GLR) index, and the normalized cumulative variance (NCUMVAR) index. The NCUMVAR index is primarily useful for identifying sensors with precision degradation.

The fault magnitude is then optimally estimated based on the model, faulty data, and the assumption that the faulty sensors have been correctly identified. This uses public domain prior art described, for example, Mantens and Naes "Multivariate Calibration", John Wiley and Sons, New York, 1989. Knowledge of the fault direction (known from the identification of the faulty sensors) and the estimated fault magnitude is then used to reconstruct estimates of the correct sensor values.

The fault classification phase provides diagnostic information as to the type of sensor fault. Specifically, four types of fault are considered: Complete Failure, Bias, Drift, and Precision Loss. Complete failure is determined by performing a regression analysis on an identified faulty sensor's measured values, and is indicated by the statistical inference that the regression line has zero slope. The other three types of fault are classified by performing a regression analysis on the estimated fault sizes since the time of identification. Bias is indicated by the statistical inference that the estimated fault size regression line has zero slope and non-zero offset, and has small residual error. Drift is indicated by the statistical inference that the estimated fault size regression line has non-zero slope, and has small residual error. Precision Loss is indicated by the statistical inference that estimated fault size regression line has zero slope, zero offset, and significant residual error. Precision Loss is also indicated if the fault is identifiable only by the NCUMVAR index.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
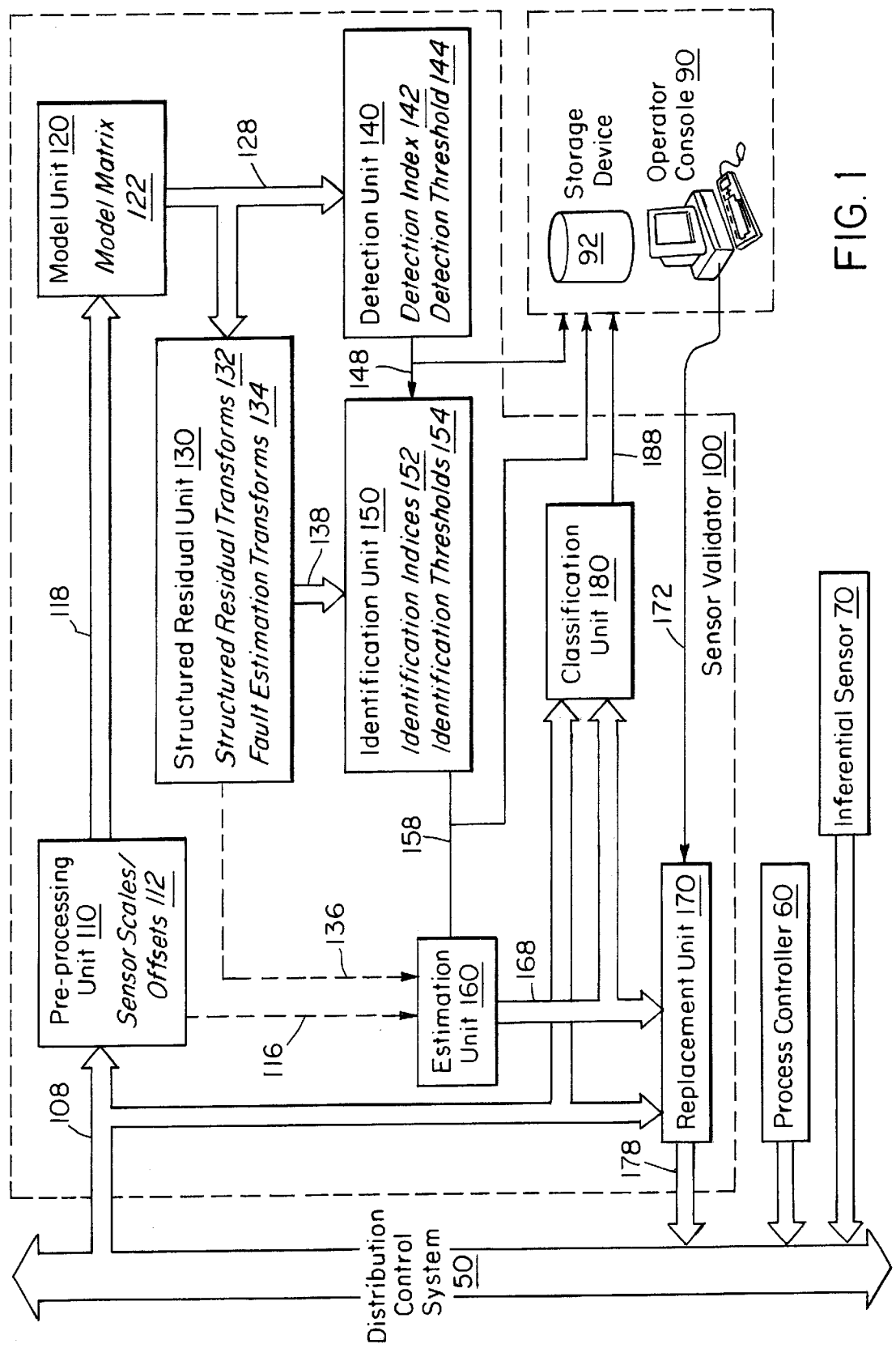
FIG. 1 shows the eight computational units of the preferred embodiment of the invention and the relationships between these units.

The sensor validation apparatus 100 of this invention is shown in FIG. 1. The external input to the sensor validator consists of sensor measurements 108, which may include status information, as might be available, for example, from a Distributed Control System (DCS) 50 in a manufacturing plant. The purpose of the invention is to use redundant information in the sensor measurements to detect when a sensor has failed, and, optionally, to provide a replacement value for a failed sensor. Other devices such as a process controller 60 or inferential sensor 70 that make use of the sensor measurements can then use the replacement values if necessary. This allows these devices to continue operation in the presence of failed sensors.

Referring again to FIG. 1, the sensor validator 100 consists of eight computational units that implement the various phases of sensor validation. These computational units, which may be implemented using a microprocessor or any other desired type of computer, are as follows:

A Pre-processing Unit 110, which maintains scaling and offset information 112 to convert the vector of sensor values 108 from the DCS 50 to a vector of normalized values 118. These normalized values have standardized units for which, in the preferred embodiment, the values are designed to have a mean of 0 and a standard deviation of 1. This is necessary for building an effective model matrix 122, detection index 142, and structured residual transforms 132 for identifying faulty sensors. The scaling and offset information is, in the preferred embodiment, derived from a statistical analysis of a historical set of sensor data.

A Model Unit 120, which maintains a model matrix 122 to convert the vector of pre-processed sensor values 118 at a given instance to an error vector referred to as the equation error 128. The equation error is used by the Structured Residual Unit 130 to calculate structured residuals values 138 and fault sizes 136, and by the Detection Unit 140 to calculate the detection index 142. The Structured Residual Unit also uses the model matrix to design structured residual transforms 132 and their corresponding fault estimation transforms 134. The model matrix is, in the preferred embodiment, built from a historical set of sensor data using Principal Component Analysis.

A Structured Residual Unit 130, which maintains a working set of structured residual transforms 132 that convert the current equation error 128 to a set of structured residual values 138. The Identification Unit 150 uses these structured residual values to determine the identity of any faulty sensors. The Structured Residual Unit also maintains a set of fault estimation transforms 134 that are used by the Estimation Unit 160 to obtain normalized fault sizes 136 for identified faults.

A Detection Unit 140, which calculates a detection index 142 from the equation error 128, and compares the detection index to detection threshold 144. If the detection index exceeds the detection threshold, then a detection event 148 is generated. This detection event is used to activate the Identification Unit 150, and is also available externally to the sensor validator, for example for operator alarm generation or event logging to an operator console 90, or to a storage device 92.

An Identification Unit 150, which uses the structured residual values 138 to calculate several sets of identification indices 152. If a detection event 148 has occurred, then the Identification Unit attempts to identify the nature of the fault by comparing the identification indices to a corresponding set of thresholds 154, according to a certain logic, described in detail later. If identification is successful, an identification event 158 is generated which is used to activate the Estimation Unit. This identification event includes information as to which sensors failed, and is also available externally to the sensor validator, for example for operator alarm generation or event logging to an operator console 90, or to a storage device 92.

An Estimation Unit 160, which is activated by an identification event 158. The Estimation Unit requests the Structured Residual Unit 130 to apply the appropriate fault estimation transform 134 (chosen based on identification information) to the equation error 128, resulting in normalized fault size information 136. The Estimation Unit then applies the appropriate scaling 116 to 136, in order to produce fault size estimates 168 scaled to the units of the original sensor values.

A Replacement Unit 170, which subtracts the estimated fault sizes 168 from the corresponding faulty sensor measurements 108, to obtain a set of replacement values 178. These replacement values are available externally to the sensor validator; for example they are written to the DCS 50 for use by other devices. The Replacement Unit is only active when the Estimation Unit 160 is active. It can also be deactivated by request of an operator 172; in this case the output 178 of the Replacement Unit is identical to the original input 108 to the sensor validator.

A Classification Unit 180, which calculates diagnostic information as to the type of sensor fault. Specifically, four types of fault are considered: Complete Failure, Bias, Drift, and Precision Loss. The Classification Unit is only active when the Estimation Unit 160 is active, which, in turn, is only active when an identification event 158 has been generated. The classification is based on an analysis of the sensor data 108 and the fault size estimations 168 since the time of identification. The classification information 188 produced by the Classification Unit is available externally to the sensor validator, for example for operator alarm generation or event logging to an operator console 90, or to a storage device 92.

A detailed description of the preferred embodiment of each of these computational units now follows.

V.1 Pre-Processing Unit

The Pre-processing Unit 110 calculates and maintains scaling and offset information to convert between measured sensor values 108 from the DCS and normalized values 118 for inputting to the Model Unit and the Structured Residual Unit. The scale value $s_i$ and offset value $o_i$ for the $i^{th}$ sensor are, in the preferred embodiment of this invention, calculated from the mean $\mu_i$ and standard deviation $\sigma_i$ of the $i^{th}$ sensor as follows:

$$s_i = \frac{1}{\sigma_i} \quad (1)$$

$$o_i = \mu_i$$

Then a measured value $u_i$ of the $i^{th}$ sensor is converted to a normalized value $x_i$ by:

$$u_i = s_i(x_i - o_i) \quad (2)$$

$\mu_i$ and $\sigma_i$ are estimated from representative sample data in the standard way well known to those skilled in the art.

V.2 Model Unit

The Model Unit 120 maintains a normal process model, which can be represented by the following equation:

$$Bx^*(t) = e^*(t) \quad (3)$$

where $x^* \in \Re^n$ is a vector of preprocessed sensor values, $B \in \Re^{m \times n}$ is the model matrix 122, and $e^* \in \Re^m$ is the equation error 128. The matrix B can be derived from mass balance or energy balance of the process, or it can be generated from process data using statistical methods such as Principal Component Analysis (PCA) or Partial Least Squares (PLS).

V.2.1 Model Unit Based on PCA

In the preferred embodiment, the normal process model is derived from process data using PCA. PCA is generally described in, for example, J. Edward Jackson "A User's Guide to Principal Components" John Wiley 1991. In PCA the sensor values $x^*(t) \in \Re^n$ are decomposed into:

$$x^*(t) = PP^T x^*(t) + \tilde{P}\tilde{P}^T x^*(t) \quad (4)$$

where $P \in \Re^{n \times (n-m)}$ are the eigenvectors associated with the principal eigenvalues $\lambda_1 \geq \lambda_2 \geq \ldots \lambda_{n-m}$ of the correlation matrix of $x^*(t)$. In this case, the model equation error $e^*(t)$ corresponds to the residual components $(\lambda_{n-m+1}, \ldots \lambda_n)$, and, as described in Gertler, Li, Huang and McAvoy "Isolation enhanced principal component analysis" *Proc. IFAC Workshop on On-line Fault Detection and Supervision in the Chemical Process Industries*, Jun. 4–5, 1998, $$B = \tilde{P}^T \quad (5)$$

In the preferred embodiment, the optimal number of principal components is chosen for optimal reconstruction capability as described in detail in Qin and Dunia "Determining the number of principal components for best reconstruction", *Proc. of the 5-th IFAC Symposium on Dynamics and Control of Process Systems*, 359–364, Corfu, Greece, Jun. 8–10, 1998.

V.3 Structured Residual Unit

The Structured Residual Unit 130 maintains transforms that are sensitive or insensitive to faults in certain directions.

These transforms are described in the context of the following fault representation.

V.3.1 Fault Representation

Under normal conditions, the equation error e*(t) 128 contains mainly measurement noise, which can be assumed to be zero mean Gaussian noise. When a sensor fault occurs, the sensor measurement will contain the normal values of the process variables and the fault, i.e., $$x(t)=x^*(t)+\Xi_i f_i(t) \quad (6)$$

where $f_i(t) \in \mathfrak{R}^{l_i}$ is a vector of the fault magnitude, and $\Xi_i \in \mathfrak{R}^{n \times l_i}$ is a matrix of fault directions. To represent a single sensor fault in the $i^{th}$ sensor $$\Xi_i = [0\ 0\ \ldots\ 1\ \ldots\ 0]^T \quad (7)$$

which is the $i^{th}$ column of the identity matrix. To represent simultaneous multiple sensor faults, $\Xi_i$ simply contains the corresponding columns of the identity matrix. Using the measurement relation of equation 6 that contains a sensor fault, the equation error 128 can be written as follows:

$$e(t)=Bx(t)=Bx^*(t)+B\Xi_i f_i(t)=e^*(t)+B\Xi_i f_i(t) \quad (8)$$

The fault will in general cause the equation error e(t) to increase. The magnitude of the equation error is used to detect sensor faults as described later. Since a distinct vector or matrix $\Xi_i$ represents each sensor fault, fault identification can be accomplished by using the direction vectors.

V.3.2 Structured Residual Transformations for Single Faults

The Structured Residual Unit 130 maintains a set of transforms referred to as structured residuals. The Identification Unit 150, described in a later section, uses the structured residual transforms to identify faulty sensors.

Structured residuals are generally described in Gertler and Singer, "A new structural framework for parity equation based failure detection and isolation", *Automatica* 26:381–388, 1990. In the present invention, a new design method for structured residuals is disclosed, referred to as "Structured Residual Approach with Maximized Sensitivity" or SRAMS.

For the case of single sensor fault in the $j^{th}$ sensor, $$B\Xi_j=b_j \quad (9)$$

where $b_j$ is the $j^{th}$ column of matrix B. Therefore, the model equation error is $$e(t)=e^*(t)+b_j f_j(t) \quad (10)$$

With a selected residual structure, a set of structured residuals r(t) can be generated by pre-multiplying the equation error vector e(t) by a transformation matrix W, $$r(t)=We(t) \quad (11)$$

It is desirable to design each element of r(t) to be responsible for one particular sensor fault but not responsible for other faults. The $i^{th}$ element of r(t) given that the $j^{th}$ sensor is faulty is represented as $$r_{ij}(t)=w_i^T e(t)=w_i^T e^*(t)+w_i^T b_j f_j(t), i,j=1,2,\ldots,n \quad (12)$$

where $w_i^T$ is the $i^{th}$ row of matrix $W \in \mathfrak{R}^{n \times m}$. Since e(t) is random noise, one can only design the residual $r_{ij}(t)$ to be sensitive or insensitive to $b_j$, the fault direction vector.

The SRAMS design criterion is stated as follows:

Choose $w_i$ such that $r_{ij}(t)$ is insensitive to the $i^{th}$ sensor fault but most sensitive to the others. Mathematically, this is equivalent to $$\max_{w_i} \sum_{j \neq i} \frac{(w_i^T b_j)^2}{\|w_i\|^2 \|b_j\|^2}$$

subject to:

$$w_i^T b_i = 0$$

Geometrically, $w_i$ is chosen to be orthogonal to $b_i$, while minimizing its angle to other fault directions $b_j$, $j \neq i$. This problem can be equivalently stated as follows:

$$\max_{w_i} \sum_{j \neq i} (w_i^T b_j^o)^2 \quad (13)$$

subject to:

$$w_i^T b_i^o = 0$$

$$\|w_i\|=1$$

where $$b_j^o = \frac{b_j}{\|b_j\|}, j=1, 2, \cdots, n \quad (14)$$

To satisfy the constraint $w_i^T b_i^o = 0$, the vector $w_i$ must be chosen as follows:

$$w_i=(I-b_i^o b_i^{o^T})z_i \in S_{w_i}, z_i \in \mathfrak{R}^m \quad (15)$$

where $S_{w_i}$ is the orthogonal complement of $b_i$. Therefore, the solution of $w_i$ is converted to the solution of $z_i$. Using a Lagrange multiplier $\lambda$, the solution of $z_i$ can be found by maximizing the following objective:

$$J = \max_{z_i}\left(\sum_{j \neq i}\left(z_i^T(I-b_i^o b_i^{o^T})b_j^o\right)^2 + \lambda\left(1-z_i^T(I-b_i^o b_i^{o^T})z_i\right)\right) \quad (16)$$

$$= \max_{z_i}\left(\sum_{j=i}^{N}\left(z_i^T(I-b_i^o b_i^{o^T})b_j^o\right)^2 + \lambda\left(1-z_i^T(I-b_i^o b_i^{o^T})z_i\right)\right)$$

The above relation holds because $(I-b_i^o b_i^{o^T})b_i^o=0$. Denoting $$[b_1^o \ \ldots\ b_n^o]=B^o \quad (17)$$

and $$(I-b_i^o b_i^{o^T})[b_1^o\ \ldots\ b_n^o]=(I-b_i^o b_i^{o^T})B^o \equiv B_i^o \quad (18)$$

which is the projection of $B^o$ onto $S_{w_i}$, the maximization problem can be rearranged as follows:

$$J = \max_{z_i}\left(\|B_i^{o^T} z_i\|^2 + \lambda\left(1-z_i^T(I-b_i^o b_i^{o^T})z_i\right)\right) \quad (19)$$

Differentiating J with respect to $z_i$ leads to $$B_i^o B_i^{o^T} z_i = \lambda(I-b_i^o b_i^{o^T})z_i \quad (20)$$

Note that $$B_i^o = (I - b_i^o b_i^{o^T})B^o \quad (21)$$
$$= (I - b_i^o b_i^{o^T})^2 B^o$$
$$= (I - b_i^o b_i^{o^T})B_i^o$$

Equation 20 can be rearranged as $$(I - b_i^o b_i^{o^T})(B_i^o B_i^{o^T} z_i - \lambda z_i) = 0$$

or $$B_i^o B_i^{o^T} z_i - \lambda z_i = 0 \quad (22)$$

Therefore $z_i$ is the eigenvector of $B_i^o B_i^{o^T}$ that corresponds to the largest eigenvalue. After $z_i$ is known, $w_i$ can be easily calculated from equation 15.

V.3.3 Structured Residual Transformations for Multiple Faults

The SRAMS design method can be extended to the case in which multiple sensors fail simultaneously. The equation error vector for multiple sensor faults is $$e(t) = e^*(t) + b_i \Xi_i f_i(t) \quad (23)$$

where $B\Xi_i \in \Re^{m \times q}$ contains q columns of B corresponding to the failed sensors, and $f_i(t) \in \Re^q$ is a vector of the fault magnitudes. Note that the columns of $B\Xi_i$ can be linearly dependent. Performing a singular value decomposition (a matrix decomposition well known to those skilled in the art) on $B\Xi_i$ and keeping only non-zero singular values yields $$e(t) = e*(t) + U_q D_q V_q^T f_i(t) \quad (24)$$
$$= e*(t) + U_q f_q(t)$$

where $$f_q(t) = D_q V_q^T f_i(t) \quad (25)$$

To design $w_q$ for multiple sensor faults, $w_q$ is chosen in the orthogonal complement of $U_q$, that is $$w_q = (I - U_q U_q^T) z_q \in S_{w_q} \quad (26)$$

similar to the single sensor fault case. Furthermore, the following objective is maximized:

$$\max_{z_q} \|z_q^T (I - U_q U_q^T) B^o\|^2 = \max_{z_q} \|z_q^T B_q^o\|^2 \quad (27)$$

subject to $$\|(I - U_q U_q^T) z_q\| = 1 \quad (28)$$

where $$B_q^o = (I - U_q U_q^T) B^o \quad (29)$$

After using a Lagrange multiplier, $z_q$ is found to be the solution to the following equation:

$$B_q^o B_q^{o^T} z_q = \lambda (I - U_q U_q^T) z_q \quad (30)$$

From 29 we obtain $$(I - U_q U_q^T)(B_q^o B_q^{o^T} z_q - \lambda z_q) = 0$$

or $$B_q^o B_q^{o^T} z_q = \lambda z_q \quad (31)$$

Therefore, $z_q$ is simply the eigenvector of $B_q^o B_q^{o^T}$ associated with the largest eigenvalue.

V.3.4 Comparison to Conventional Structured Residual Approach

The conventional structured residual approach (Geitler and Singer, "A new structural framework for parity equation based failure detection and isolation", *Automatica* 26:381–388, 1990, and Gertler and Singer, "Augmented models for statistical fault isolation in complex dynamic systems", *Proceedings of the American Control Conference*, pp317–322, 1985) chooses $w_i$ to be insensitive to a particular fault of interest, but it does not maximize the sensitivity to other faults. In a typical structured residual design, the selecting of $w_i$ is not unique and is somewhat arbitrary. The arbitrariness in this design leads to a sub-optimal solution that does not maximize the potential to isolate faults. The SRAMS approach of the present invention embodies a unique design of $w_i$ that maximizes the sensitivity to other faults while being insensitive to the fault of interest.

V.3.5 Transformations Maintained by the Structured Residual Unit

In the preferred embodiment of the invention, the Structured Residual Unit maintains a core set of structured residual transforms corresponding to single sensor faults as described in section V.3.2. These core structured residual transforms form the initial working set of structured residual transforms 132 and associated fault estimation transforms 134.

When one or more sensors measurements 108 from the DCS are marked as bad on input to the sensor validator, a new working set of structured residual transforms, and associated fault estimation transforms, is created by the Structured Residual Unit. These are as follows: if b sensors are marked as bad on input, then n−b+1 new structured residual transforms are designed. The first structured residual transform is designed with a $\Xi$ that selects the columns of the identity matrix corresponding to the b bad sensors; this structured residual transform is insensitive to these bad sensor values but is sensitive to faults in any of the other sensors. The remaining n−b structured residual transforms are designed with a $\Xi$ which selects the columns of the identity matrix correspond to the b bad sensors plus one more column corresponding to each other sensor in turn. This allows the identification of a further faulty sensor in addition to those marked as bad on input.

Other structured residual transforms can optionally be designed and added to the working set. For example, a set of transforms based on a $\Xi$ that selects all pairs of columns from the identity matrix. This allows identification of pairs of simultaneous faults. However, a preferred method of detecting multiple faults is to use several sensor validators. For example, in FIG. 1, if a process controller 60 uses 5 sensor values as inputs, up to 5 sensor validators 100 can be utilized, one for each input of the controller. Each sensor validator uses one of the inputs together with other redundant sensor measurements that are not input to the process controller.

Another scenario is to have several sensor validators, each optimized for detection and identification of faults in particular sensors, feeding another sensor validator that is optimized for reconstruction.

V.4 Detection Unit

The Detection Unit 140 monitors the correlation structure of the pre-processed sensor values by calculating a detection index 142 based on the current equation error. If this detection index exceeds a threshold 144 based on a statistically inferred confidence limit, a detection event 148 is generated, and the Identification Unit is activated. In the preferred embodiment a filtered normalized fault detection index (NFFDI) is used as described below.

V.4.1 Fault Detection Index

The fault detection index (FDI) is defined as follows $$FDI = \|e(t)\|^2 = \|e^*(t) + B\Xi_i f_i(t)\|^2 \quad (7)$$

When no fault is present, $FDI = \|e^*(t)\|^2 = \|Bx^*(t)\|^2$. Therefore, the detection alarm threshold for FDI is actually the confidence limit for $\|e^*(t)\|^2$.

V.4.2 Normalized Fault Detection Index

In practical industrial processes, the process variables $x^*(t)$ typically are not normally distributed. However, the equation error $e^*(t)$ 128 contains mainly measurement noise and therefore can be considered zero mean Gaussian noise. As a consequence $e^*(t)^T R_e^{-1} e^*(t)$ satisfies a $\chi^2$ distribution with m degrees of freedom, where $R_e = E\{e(t)e^T(t)\}$ is the equation error covariance matrix. Thus defining the normalized fault detection index as $$NFDI = e(t)^T R_e^{-1} e(t)$$

the detection alarm threshold for $d_\alpha$ for NFDI can be determined, in a manner well known to those skilled in the art, for any significance level $\alpha$ using knowledge of the $\chi^2$ distribution.

Note that $NFDI = \|\eta(t)\|^2$ where $\eta(t) = R_e^{-1/2} e(t)$ and $R_e^{-1/2}$ is the matrix square root of the inverse equation error covariance matrix. $R_e^{-1/2}$ has the effect of decorrelating the equation error.

V.4.3 Normalized Filtered Fault Detection Index

In the preferred embodiment, an exponentially weighted moving average (EWMA) filter is applied to the equation errors in order to reduce the effect of transients and noise in the measured data:

$$\bar{e}(t) = \gamma \bar{e}(t-1) + (1-\gamma) e(t) \quad 0 \leq \gamma < 1 \quad (32)$$

It directly follows that $$\bar{e}(t) = (1-\gamma) \sum_{k=0}^{\infty} \gamma^k e(t-k) \quad (33)$$

and $$\bar{\eta}(t) = (1-\gamma) \sum_{k=0}^{\infty} \gamma^k \eta(t-k)$$

where $$\bar{\eta}(t) = R_e^{-1/2} \bar{e}(t) \quad (34)$$

The filtered normalized fault detection index 142 is defined as $$NFFDI = \|\bar{\eta}(t)\|^2 \quad (35)$$

Without faults, since $\eta(t)$ is normally distributed, $\bar{\eta}(t)$ is also normally distributed with $E\{\bar{\eta}(t)\} = E\{\eta(t)\} = 0$. However, since the EWMA filter significantly reduces the variance of $\bar{\eta}(t)$, the confidence limit $d_\alpha$ can not be applied to $\bar{d}_\alpha$ directly. The variance of $\bar{\eta}(t)$ is given by:

$$var(\bar{\eta}(t)) = E\{\bar{\eta}^T(t)\bar{\eta}(t)\} \quad (36)$$

$$= \frac{1-\gamma}{1+\gamma} E\{\bar{\eta}^T(t)\bar{\eta}(t)\} \left(1 + 2\sum_{k=1}^{\infty} \gamma^k \rho(k)\right)$$

$$= var(\eta(t)) \frac{1-\gamma}{1+\gamma} \left(1 + 2\sum_{k=1}^{\infty} \gamma^k \rho(k)\right)$$

where $$\rho(k) = \frac{E\{\eta^T(t)\eta(t-k)\}}{E\{\eta^T(t)\eta(t)\}} \quad (37)$$

is an autocorrelation function. If $\eta(t)$ were independently and identically distributed, $\rho(k)$ would be 0 for any $k > 0$. However, for practical data, this condition is hardly satisfied due to dynamic transients. The non-zero $\rho(k)$ on the right hand side of equation 36 will contribute to the determination of the detection alarm threshold for $\bar{d}_\alpha$.

Since the threshold for $\|\eta(t)\|^2$ is $d_\alpha$, from equation 36, it is straightforward that the detection alarm threshold 144 for $\|\bar{\eta}(t)\|^2$ is:

$$\bar{d}_\alpha = d_\alpha \left(1 + 2 \sum_{k=1}^{\infty} \gamma^k \rho(k)\right) \frac{1-\gamma}{1+\gamma} \quad (38)$$

Notice that $|\rho(k)| \leq 1$, and therefore $$\bar{d}_\alpha \leq d_\alpha \left(1 + 2 \sum_{k=1}^{\infty} \gamma^k |\rho(k)|\right) \frac{1-\gamma}{1+\gamma} \quad (39)$$

$$\leq d_\alpha \left(1 + 2 \sum_{k=1}^{\infty} \gamma^k\right) \frac{1-\gamma}{1+\gamma}$$

$$= d_\alpha \left(1 + 2 \frac{\gamma}{1-\gamma}\right) \frac{1-\gamma}{1+\gamma}$$

$$= d_\alpha$$

Therefore, the threshold for NFFDI is normally smaller than that for NFDI. In practice, $\rho(k)$ decays to zero after some time k; hence, the Detection Unit only maintains a fixed number of terms in order to calculate $\bar{d}_\alpha$. The significance $\alpha$ is an adjustable parameter of the Detection Unit.

Figure 4:
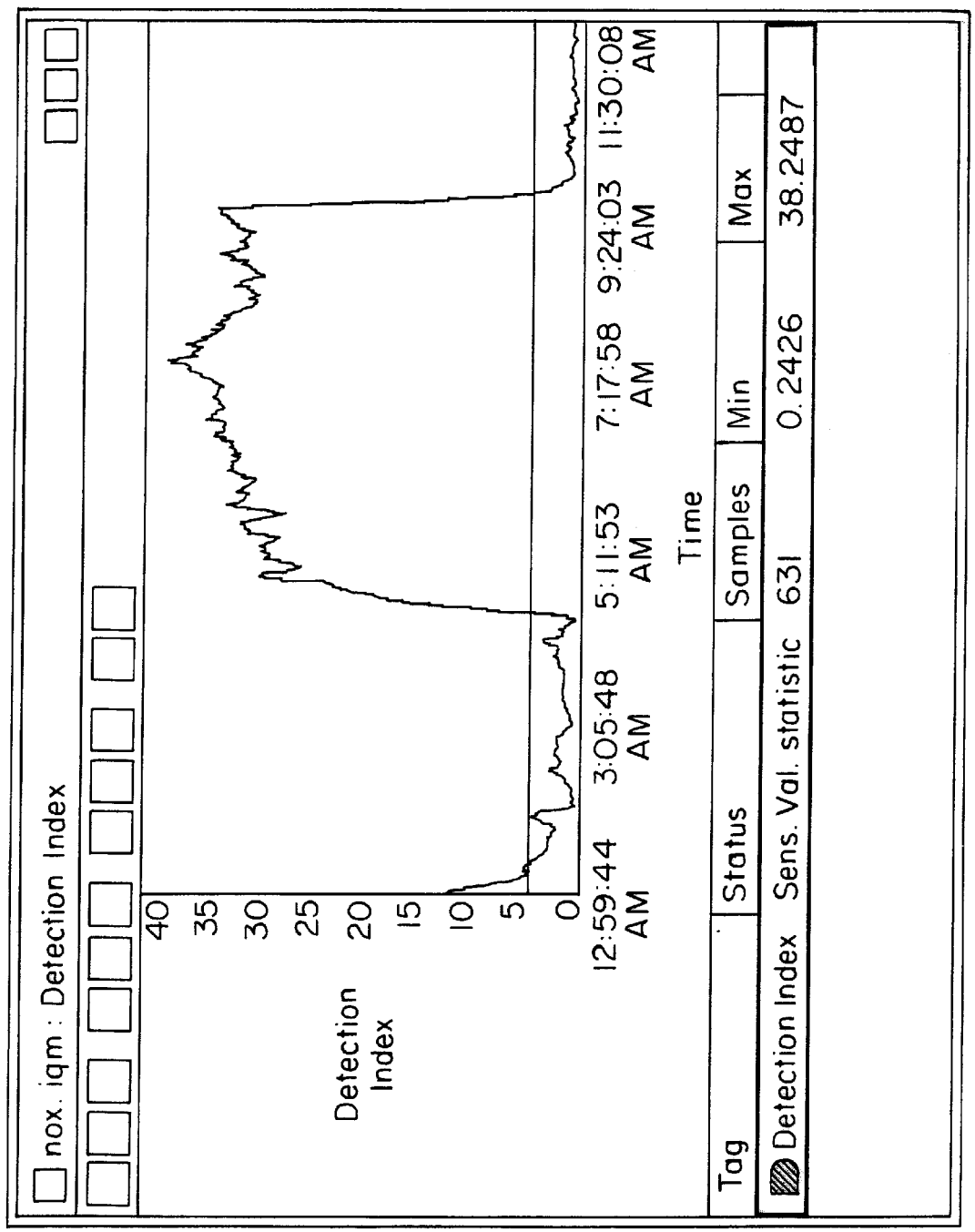
FIG. 4 shows the detection index of the present invention rapidly increasing and exceeding its threshold on the introduction of a fault to a boiler process.

FIG. 4 shows how the NFFDI rapidly increases on the introduction of a fault.

V.5 Identification Unit

The Identification Unit 150 is activated if the Detection Unit generates a detection event. The Identification Unit calculates several sets of indices 152 that are used to determine if a detected fault can be identified with the failure of one or more sensors. Each set of indices is derived from the working set of structured residuals maintained by the Structured Residual Unit 130. In general, if a single index in a set is less than a threshold, whereas all other indices in the set are greater than the threshold, then a fault of known direction is identified. The direction of this fault corresponds to directions that define the structured residual associated with the index. In the most typical case this corresponds to a fault in a single sensor.

Figure 2:
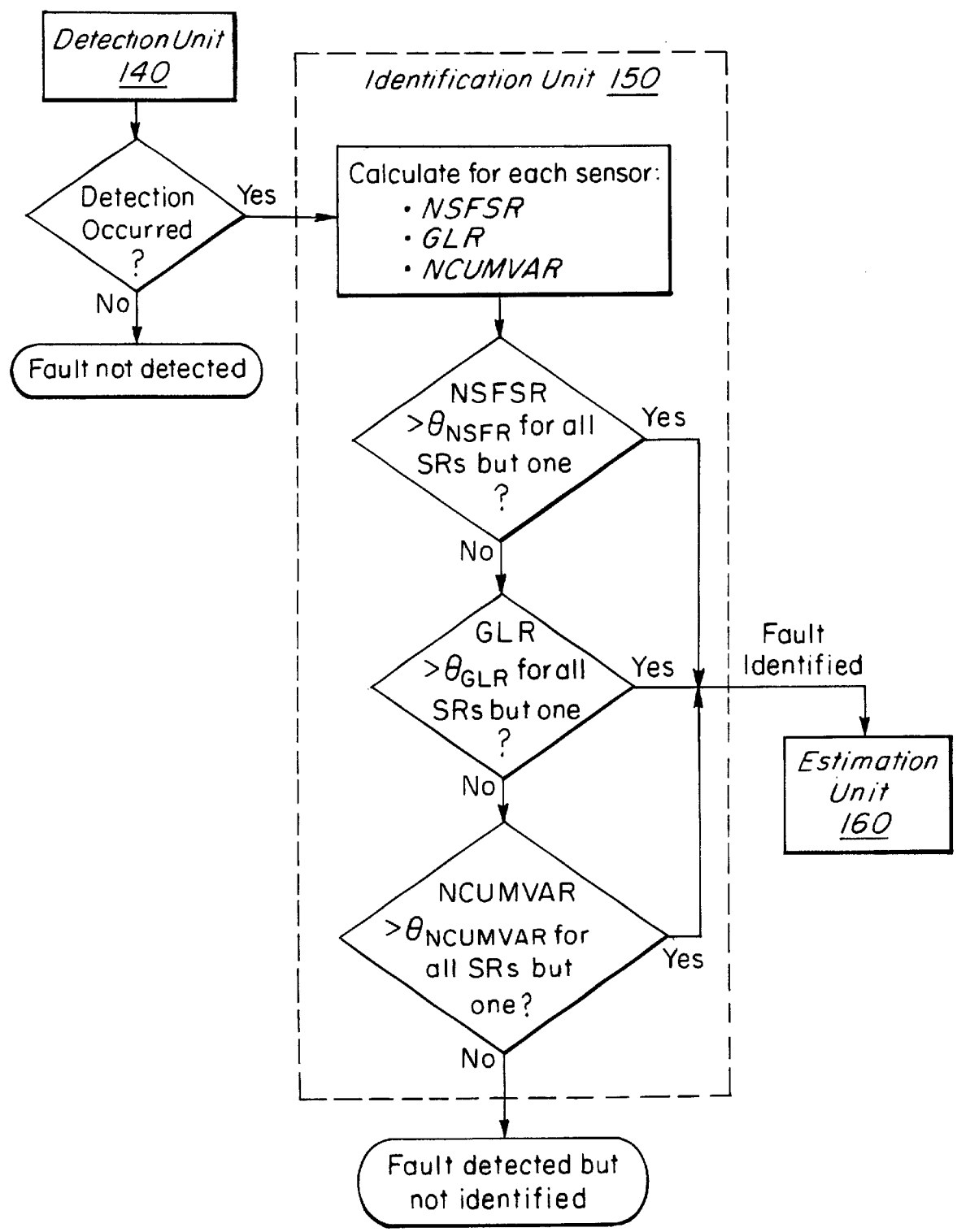
FIG. 2 shows a flow diagram of the identification process in the embodiment of FIG. 1.

In the preferred embodiment of this invention, the Identification Unit maintains 3 sets of indices 152 and their associated thresholds 154. These sets of indices are the Normalized Squared Filtered Structured Residuals (NSFSR), the Generalized Likelihood Ratio (GLR) indices, and the Normalized Cumulative Variance (NCUMVAR) indices. The associated thresholds are denoted by $\vartheta_{NSFSR}$, $\vartheta_{GLR}$, and $\vartheta_{NCUMVAR}$. A flow diagram that summarizes the fault identification process is shown in FIG. 2.

V.5.1 Normalized Squared Filtered Structured Residual

Ideally, each structured residual $r_i(t)$ is supposed to be zero or close to zero when no sensor fails. However, due to modeling error, measurement noise and other uncertainties, $r_i(t)$ is never equal to zero. Therefore, the non-zero confidence limit for each $r_i(t)$ i, j=1,2, ..., n is determined using statistical techniques.

Without a fault or with the sensor(s) associated with the $i^{th}$ structured residual being faulty, the $i^{th}$ structured residual follows a normal distribution, $$r_i(t) = w_i^T e(t) \sim \aleph(0, w_i^T R_e w_i) i=1,2,\ldots,n \qquad (40)$$

where $R_e = E\{e(t)e^T(t)\}$ is the equation error covariance matrix.

Consequently $$\frac{r_i^2(t)}{w_i^T R_e w_i} \sim \chi^2(1) \quad i=1,2,\cdots,n \qquad (41)$$

Then, defining the $i^{th}$ normalized structured residual (NSR) as $$v_i(t) \equiv \frac{r_i(t)}{\sqrt{w_i^T R_e w_i}} \sim \aleph(0,1) \qquad (42)$$

and defining the normalized squared structured residual (NSSR) as $v_i^2(t)$, the confidence limit for NSSR is $\chi_\alpha^2(1)$ where $\alpha$ is the level of significance.

When an EWMA filter is applied to the NSR, the normalized filtered structured residual (NFSR) is $$\bar{v}_i(t) = \gamma \bar{v}_i(t-1) + (1-\gamma)v_i(t) = (1-\gamma)\Sigma \gamma^k v(t-k) \qquad (43)$$

Without a fault or with the sensor(s) associated with the $i^{th}$ structured residual being faulty, the NFSR also follows a normal distribution with $$E\{\bar{v}_i(t)\} = E\{v_i(t)\} = 0$$

and $$\text{var}(\bar{v}_i(t)) = \text{var}(v_i(t)) \frac{1-\gamma}{1+\gamma}\left(1 + 2\sum_{k=1}^{\infty} \gamma^k \psi_i(k)\right) \qquad (44)$$

where $$\psi_i(k) = \frac{E\{v_i(t)v_i(t-k)\}}{E\{(v_i(t))^2\}}$$

is an autocorrelation function.

Therefore the alarm threshold for the normalized squared filtered structured residual (NSFSR) defined by $\bar{v}_i^2(t)$ has an alarm threshold of $$\vartheta_{NSFSR}^i \equiv \bar{\eta}_i^\alpha(t) = \frac{1-\gamma}{1+\gamma}\left(1 + 2\sum_{k=1}^{\infty} \gamma^k \psi_i(k)\right)\chi_\alpha^2(1) \qquad (45)$$

$$i=1,2,\cdots,n$$

If all sensors are normal $\bar{v}_i^2(t)$ is normally below its threshold as indicated by:

$$P\{\bar{v}_i^2(t) > \vartheta_{NSFSR}^i\} = \alpha$$

If the sensor(s) associated with the $i^{th}$ structured residual are faulty, by the SRAMS design, $\bar{v}_i^2(t)$ is not affected by the fault. However, the other residuals, $\bar{v}_j^2(t) j \neq i$, will increase significantly because their sensitivity to the faults in other sensors is maximized. Therefore, with a selected level of significance $\alpha$ and an instant t, among NSFSRs, the existence of exactly one NSFSR that is less than its threshold $\vartheta_{NSFSR}^i$ identifies a faulty sensor, and generates an identification event 158. An example of this is shown in o sensor 5 of a boiler process.

Figure 7A:
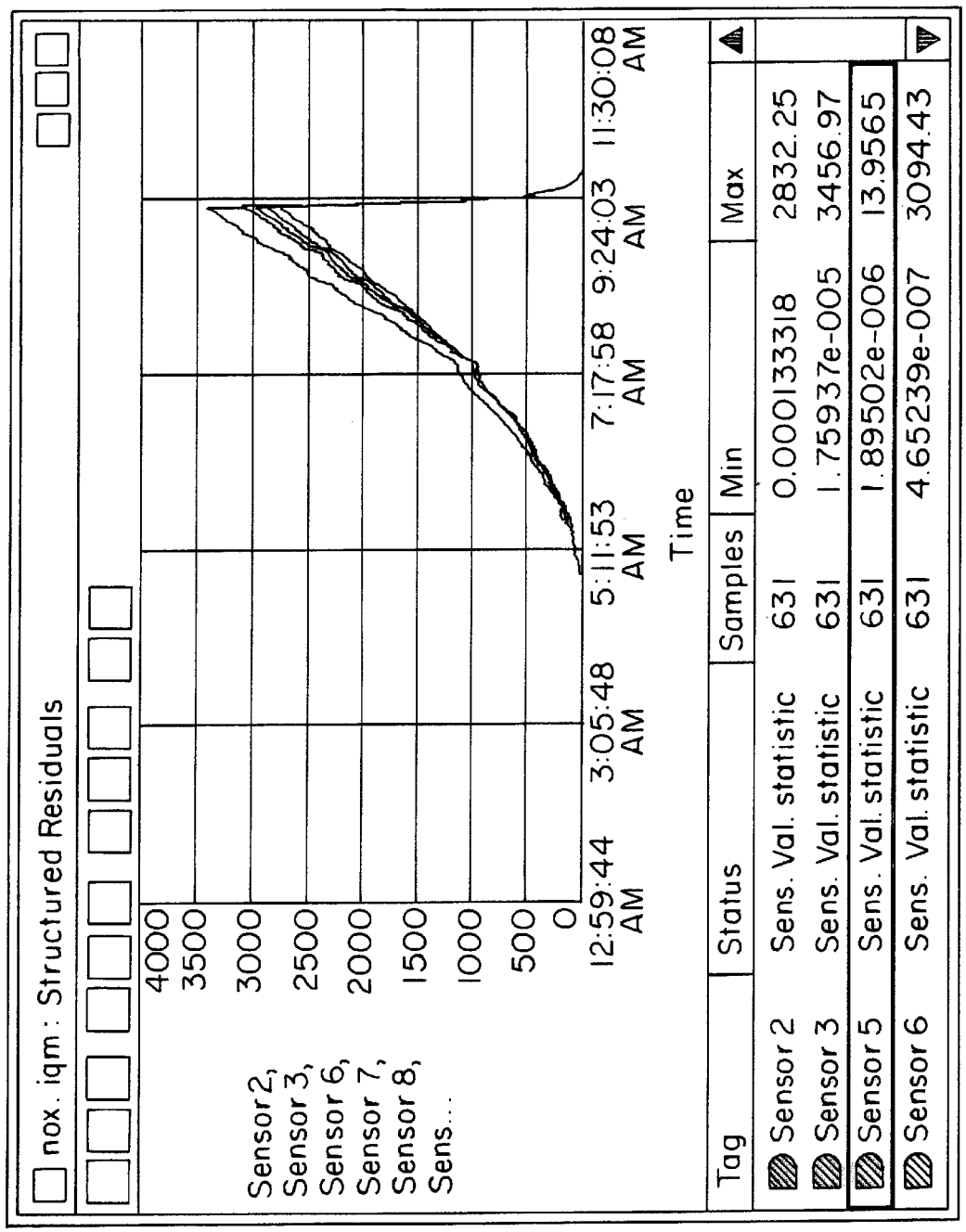
FIG. 7 shows the NSFSR indices of the present invention in response to the introduction of a drift fault into sensor 5 of a boiler process.
Figure 7B:
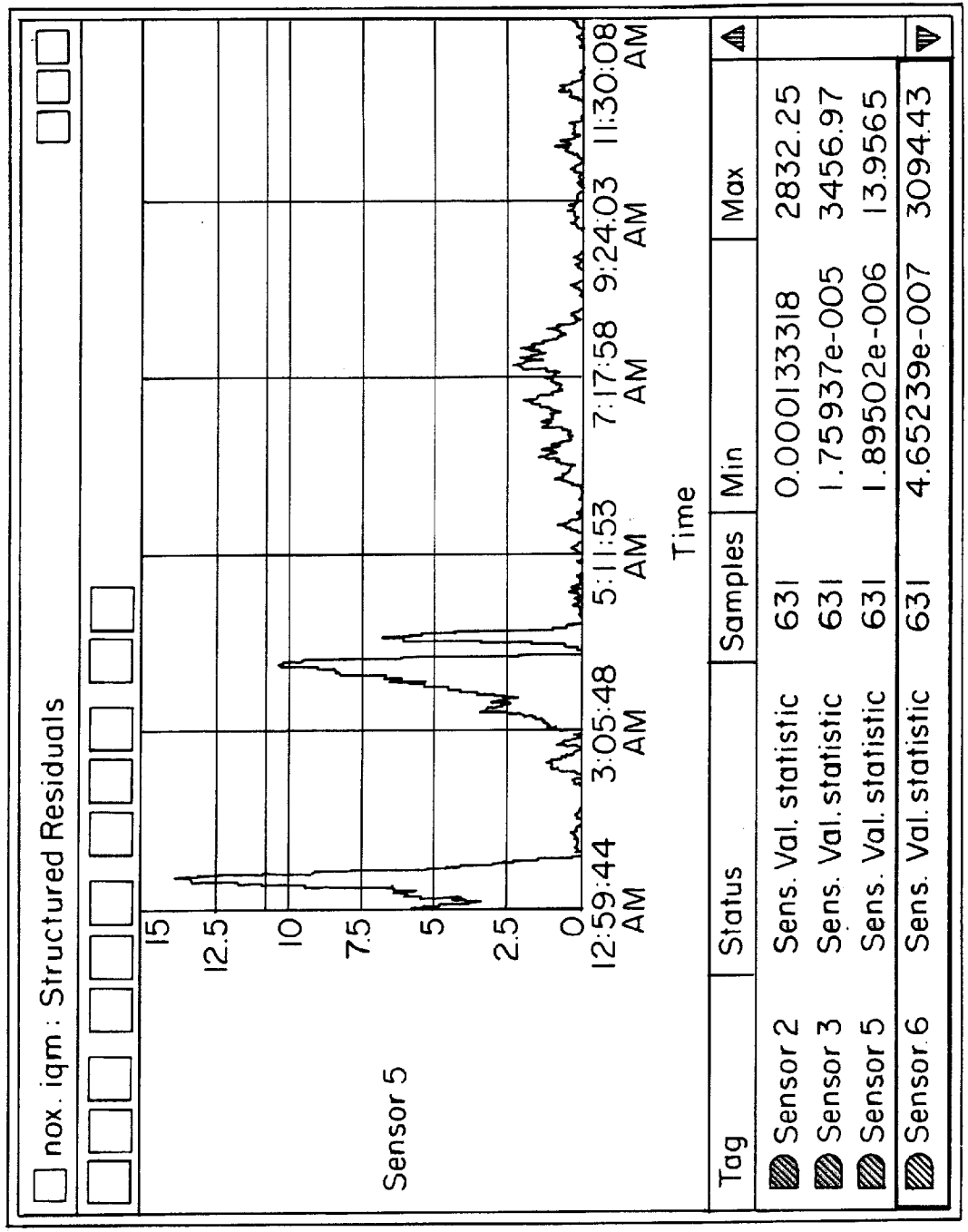

FIG. 7A which shows the NSFSRs that do not correspond to faulty sensor 5 become very large, whereas FIG. 7B shows the NSFSR for sensor 5 remains below its threshold.

Since there are often many sensors to be validated, the probability for at least one residual to exceed its threshold is significant, even though the probability for each index to exceed its threshold is small. For example, assuming that there are 20 residuals $r_i(t)$ i=1,2, ... 20. The probability for at least one NSFSR to exceed its threshold is (assuming $\alpha=0.05$)

$$P = 1 - (1-\alpha)^{20} = 1 - 0.95^{20} = 0.642$$

even though all sensors are normal. Therefore, the NSFSRs are not used for fault detection. Instead, the Detection Unit uses the NFFDI to trigger a detection event after which the Identification Unit uses the various sets of indices, starting with the NSFSRs, to identify the faulty sensors.

Optionally, the NSFSR indices can be calculated at each cycle, whether or not the Detection Unit has generated a detection event. However, the index sets described in the next two sections accumulate structured residual information since the time of fault detection, so they only make sense after a detection event has been generated.

V.5.2 Generalized Likelihood Ratio Index

If a sensor fault incurs significant changes in the mean, e.g., complete failure, bias, or drift, the generalized likelihood ratio (GLR) is usually an appropriate test for detecting this (Benveniste, Basseville and Moustakides "The asymptotic local approach to change detection and model validation" *IEEE Trans. Auto. Cont.* 32(7):538–592, July 1987.

To clarify the following analysis, each structured residual transform is assumed to correspond to a fault in a single sensor. In general, however, the GLR indices can be constructed and monitored irrespective of the structured residual design.

As shown by equation 42, when no sensor is faulty $v_i(t)$ is zero-mean and normally distributed, with unit variance. However, if the $j^{th}$ sensor becomes faulty at instant $t_f$ it is clear that $$v_i(t) = \frac{w_i^T e_*(t)}{\sqrt{w_i^T R_e w_i}} + \frac{w_i^T b_j f_j(t)}{\sqrt{w_i^T R_e w_i}} \qquad (46)$$

is no longer zero-mean but the variance is unchanged. In other words $$v_i(t) \sim \begin{cases} \aleph(0,1) & \text{if } t < t_f \\ \aleph(\mu_{ij}, 1) & \text{if } t \geq t_f \end{cases} \qquad (47)$$

where $$\mu_{ij}(t) \equiv \frac{w_i^T b_j f_j(t)}{\sqrt{w_i^T R_e w_i}} \tag{48}$$

It should be noted that $\mu_{jj}=0$ by the SRAMS design.

To detect the mean change of $v_i(t)$, define the following GLR function $$S_{t_f}^t(\mu_{ij}) = \frac{\sum_{k=t_f}^{t} v_i^2(k) - \sum_{k=t_f}^{t}(v_i(k)-\mu_{ij})^2}{t-t_f+1} \tag{49}$$

Differentiating $S_{t_f}^t(\mu_{ij})$ with respect to $\mu_{ij}$ produces the optimal estimate of $\mu_{ij}$ $$\hat{\mu}_{ij} = \frac{\sum_{k=t_f}^{t} v_i(k)}{t-t_f+1} \tag{50}$$

With $\hat{\mu}_{ij}$, $S_{t_f}^t(\mu_{ij})$ is maximized with $$S_{t_f}^t(\hat{\mu}_{ij})=\hat{\mu}_{ij}^2 \tag{51}$$

If the $j^{th}$ sensor is faulty, $\mu_{jj}=0$, and $v_j(t) \sim \aleph(0,1)$. From equation 50, $$\hat{\mu}_{jj}(t) \sim \aleph(0,1)$$

or $$S_{t_f}^t(\hat{\mu}_{ij})=\hat{\mu}_{jj}^2 \sim \chi^2(1)$$

Therefore, with a selected level of significance α and an instant t, among the n GLRs $$S_{t_f}^t(\hat{\mu}_{1j}), S_{t_f}^t(\hat{\mu}_{2j}), \ldots, S_{t_f}^t(\hat{\mu}_{nj})$$

the existence of exactly one GLR that is less than the threshold $\aleph_{GLR}=\chi_\alpha^2(1)$ identifies a faulty sensor, and generates an identification event 158.

V.5.3 Normalized Cumulative Variance Index

If a sensor incurs a precision degradation fault, the GLR index set will have difficulty identifying it. To identify the location of precision degradation faults, the mean and variance of the NSR is calculated since the time the fault occurred:

$$NCUMMEAN_i(t) = \frac{1}{t-t_f+1}\sum_{k=t_f}^{t} v_i(k)$$

$$NCUMVAR_i(t) = \frac{1}{t-t_f}\sum_{k=t_f}^{t}(v_i(k)-NCUMMEAN_i(t))^2$$

Assuming, for clarity of explanation, each structured residual transform corresponds to a fault in a single sensor, when either no sensor or the $i^{th}$ sensor fails, $$NCUMVAR_i(t) \sim \frac{1}{t-t_f}\chi^2(t-t_f-1)$$

Therefore, with a selected level of significance α and an instant t, among the n NCUMVARs, the existence of exactly one NCUMVAR that is less than the threshold $$\vartheta_{NCUMVAR} = \frac{1}{t-t_f}\chi_\alpha^2(t-t_f-1)$$

identifies a sensor with precision fault, and generates an identification event 158.

V.6 Estimation Unit

The Estimation Unit 160 is only active if the Identification Unit 150 has generated an identification event 158. The Estimation Unit then optimally estimates the fault magnitude based on the model, the faulty data, and the matrix $\Xi_i$ corresponding to the structured residual transform that was instrumental in generating the identification event. This optimal estimation is based on public domain prior art as described, for example, Martens and Naes "Multivariate Calibration", John Wiley and Sons, New York, 1989.

The optimal estimation is achieved by choosing a time function $f_q(t)$ in the direction $U_q$ where, as in equation 24, $U_q$ is the orthogonal left hand side matrix of a singular value decomposition on $B\Xi_i$ in which only non-singular values are maintained. In other words, minimize $$J=\|e^*(t)\|^2=\|e(t)-U_q f_q(t)\|^2 \tag{52}$$

A least square solution to this problem leads to:

$$\hat{f}_q(t)=U_q^T e(t) \tag{53}$$

The original fault magnitude $f_i(t)$ can be estimated using equation 25:

$$\hat{f}_i(t)=(D_q V_q^T)^+ \hat{f}_q(t) \tag{54}$$

where $(\ )^+$ is the Moore-Penrose pseudo-inverse, well known to those skilled in the art. The Structured Residual Unit 130 maintains the estimation matrix 134

$$\Xi_i(D_q V_q^T)^+ U_q^T \tag{55}$$

for each structured residual it maintains. The estimation matrix corresponding to the structured residual that identified the fault is used to map the equation error 128 to an estimate of the fault vector in the pre-processed sensor value space 136. The Estimation Unit then applies the inverse scaling 116 from the Pre-processing Unit resulting in an estimate of the fault vector in the original sensor space 168:

$$f_u(t) = diag\left(\frac{1}{s_1}\frac{1}{s_2}\ldots\frac{1}{s_2}\right)\Xi_i(D_q V_q^T)^+ U_q^T e(t) \tag{56}$$

Figure 5:
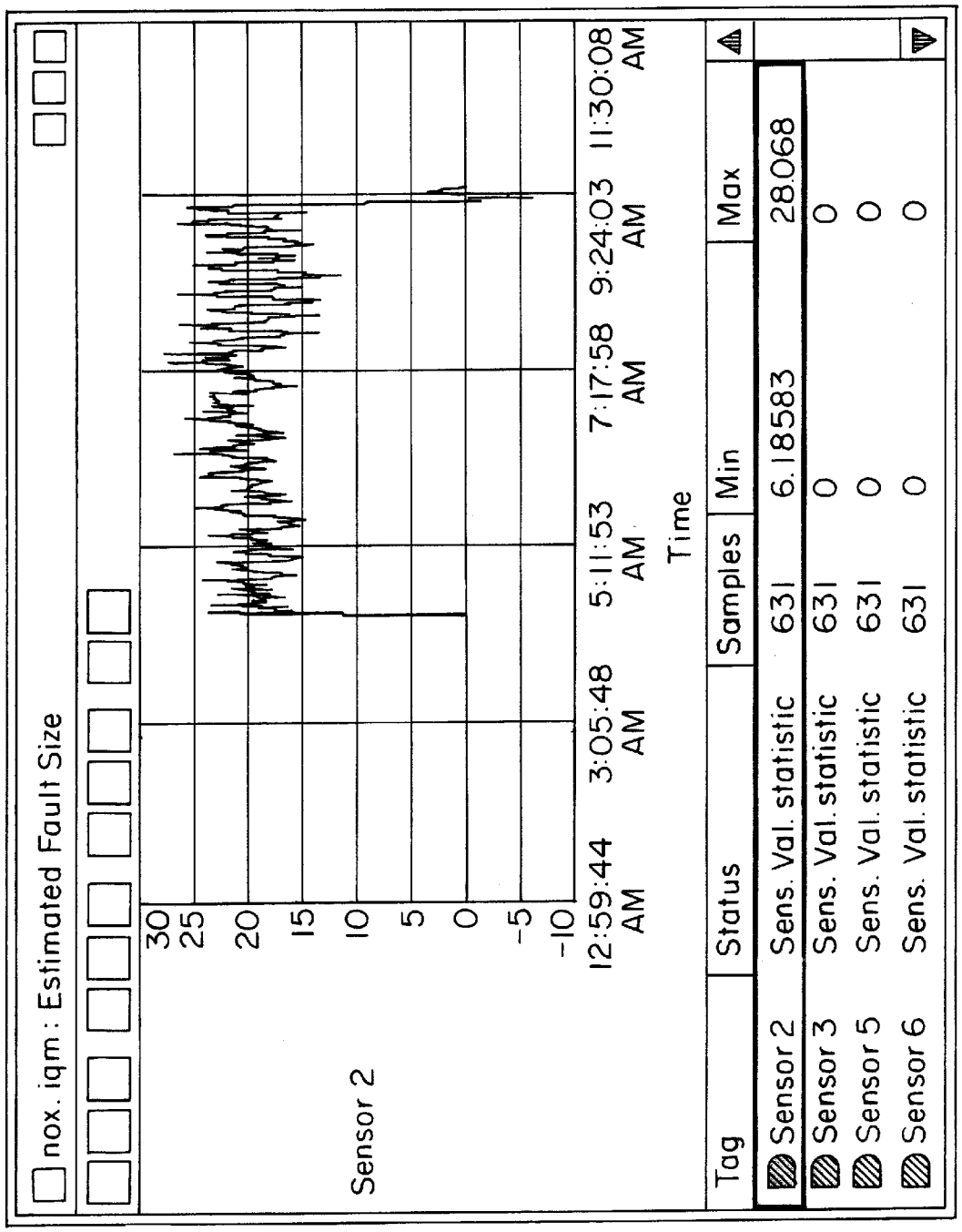
FIG. 5 shows the output of the Estimation Unit on introduction of a bias fault into sensor 2 of a boiler process.
Figure 6:
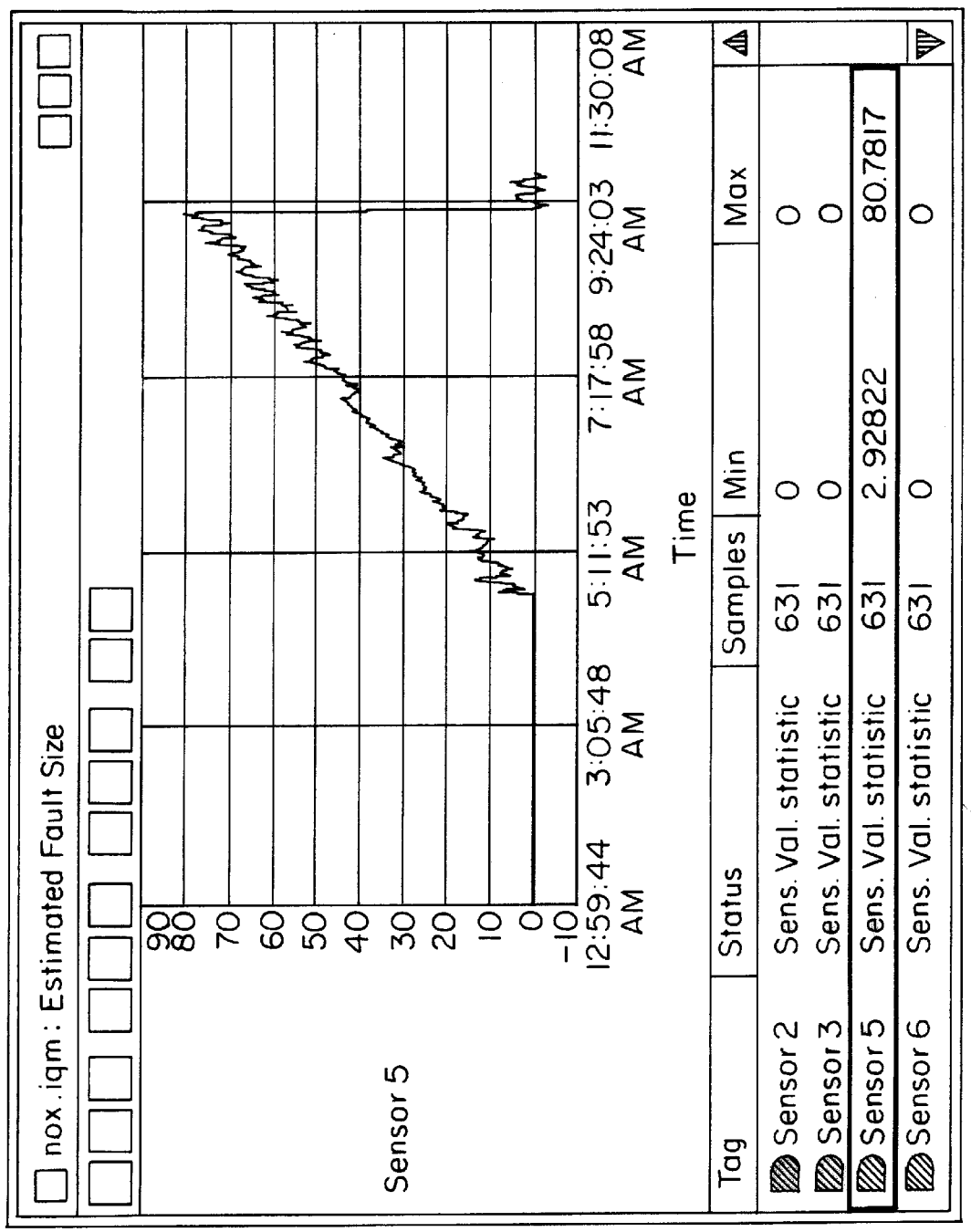
FIG. 6 shows the output of the Estimation Unit on introduction of a drift fault into sensor 5 of a boiler process.

FIG. 5 shows the output of the Estimation Unit for a bias fault in Sensor 2. FIG. 6 shows the output of the Estimation Unit for a drift fault in Sensor 5. In both cases the fault size is accurately estimated.

V.7 Replacement Unit

The Replacement Unit 170 simply takes the estimate of the fault vector in the original sensor space 168 as estimated by the Estimation Unit (equation 56) and subtracts the estimated fault from the measured vector of sensor values 108 to produce a vector of replacement values 178:

$$\hat{u}(t)=u(t)-\hat{f}_u(t) \tag{57}$$

The Replacement Unit is only active if Estimation Unit 160 is active, which in turn is only active if the Identification Unit 150 has generated an identification event 158. In addition, as a safety feature, an operator of the apparatus can explicitly disable (172) the Replacement Unit.

V.8 Classification Unit

The Classification Unit 180 calculates diagnostic information as to the type of sensor fault. Specifically, four types of fault are considered: Complete Failure, Bias, Drift, and Precision Loss.

The Classification Unit is only active when an identification event 158 has occurred. From the point when a sensor is first identified as being faulty, a buffer of measured sensor values is maintained and a buffer of estimated fault sizes for that sensor is also maintained. The information in these two buffers is analyzed and used to classify the type of fault for that sensor. The analysis primarily makes use of statistical inference, so a significance level $\alpha$ is required which is an adjustable parameter of the Classification Unit.

Figure 3A:
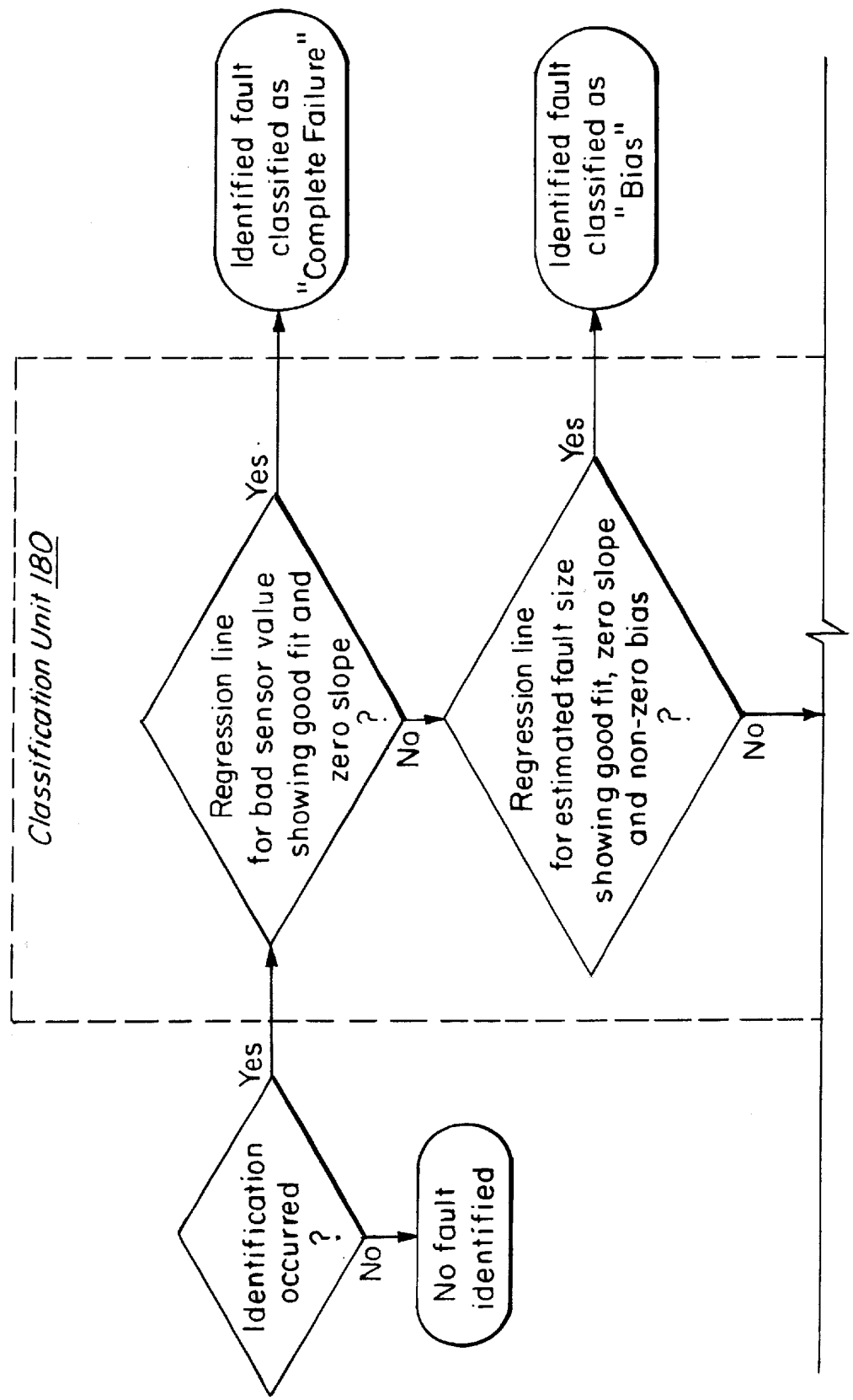
FIGS. 3A and 3B show a flow diagram of the classification process in the embodiment of FIG. 1.
Figure 3B:
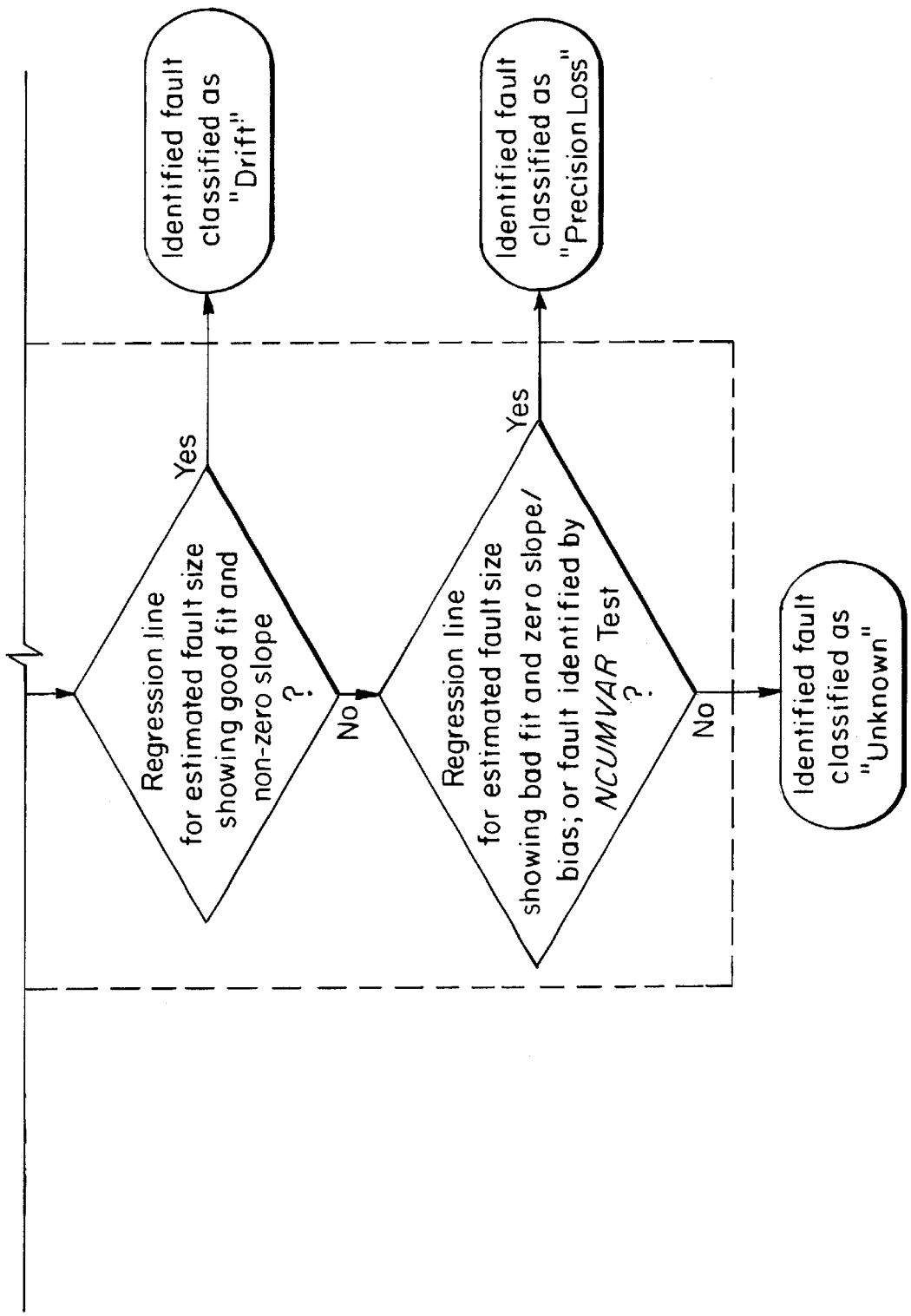

For clarity of explanation, assume that a single sensor fault has been identified by the Identification unit 150. A flow diagram of the classification logic is shown in FIGS. 3A and 3B.

V.8.1 Classification Type: Complete Failure

Complete failure is determined by performing a regression analysis on the faulty sensor's measured values 108, and is indicated by the statistical inference that the regression line fits well, and has zero slope.

Let $\{k, u_i(k) | k = t_{id}, \ldots, t\}$ be the sequence of points for which the regression line is calculated, where $t_{id}$ is the point at which the sensor was identified as faulty, and t is the current point in time.

Using standard least squares regression, which minimizes the residual between the points and the best fit line, the slope $\beta$ and y-intercept $\alpha$ are estimated as:

$$\hat{\beta} = \frac{\sum_{k=t_{id}}^{t}(k-\bar{k})(u_i(k)-\bar{u}_i)}{\sum_{k=t_{id}}^{t}(k-\bar{k})^2} \tag{58}$$

$$\hat{\alpha} = \bar{u}_i - \hat{\beta}\bar{k}$$

where $$\bar{k} = \frac{1}{t-t_{id}+1}\sum_{k=t_{id}}^{t} k \tag{59}$$

$$\bar{x}_i = \frac{1}{t-t_{id}+1}\sum_{k=t_{id}}^{t} u_i(k)$$

To test if the slope is statistically equal to 0, construct the following statistic:

$$|t_\beta| = \frac{|\hat{\beta}|}{SD(\hat{\beta})} \tag{60}$$

where the standard deviation of $\hat{\beta}$ is given by $$SD(\hat{\beta}) = \frac{\sigma}{\sqrt{\sum_{k=t_{id}}^{t}(k-\bar{k})^2}} \tag{61}$$

and the standard deviation $\sigma$ of the residual is estimated by $$\hat{\sigma} = \sqrt{\frac{\sum_{k=t_{id}}^{t}\hat{e}_i^2(k)}{t-t_{id}-1}} \tag{62}$$

where $$\hat{e}_i(k) = u_i(k) - (\beta k + \alpha)$$

is the residual error.

The statistic given in equation 60 satisfies Student's t distribution with $t-t_{id}-1$ degrees of freedom (see, for example Birkes and Dodge "Alternative Methods of Regression", John Wiley & Sons 1993).

Goodness of fit of the regression line is determined by the linear correlation coefficient exceeding a specified threshold.

V.8.2 Classification Type: Bias

Bias is determined by performing a regression analysis on the faulty sensor's fault size estimates 168 as calculated by Estimation Unit 160, and is indicated by the statistical inference that the regression line fits well, has zero slope, and has non-zero bias.

Let $\{k, f_i(k) | k = t_{id}, \ldots, t\}$ be the sequence of points for which the regression line is calculated, where $t_{id}$ is the point at which the sensor was identified as faulty, and t is the current point in time. Testing for zero slope is the same as for classifying Complete Failure, except that the fault size sequence $f_i(k)$ replaces the sensor value sequence $u_i(k)$. Goodness of fit of the regression line is determined by the linear correlation coefficient exceeding a specified threshold. To test for non-zero bias, calculate the statistic:

$$|t_\alpha| = \frac{|\bar{\alpha}|(t-t_{id}+1)}{\sigma} \tag{63}$$

which also satisfies Student's t distribution with $t-t_{id}-1$ degrees of freedom.

V.8.3 Classification Type: Drift

Drift is determined by performing a regression analysis on the faulty sensor's fault size estimates 168 as calculated by Estimation Unit 160, and is indicated by the statistical inference that the regression line fits well, and has non-zero slope.

V.8.4 Classification Type: Precision Loss

Precision Loss is determined by performing a regression analysis on the faulty sensor's fault size estimates 168 as calculated by Estimation Unit 160, and is indicated by the statistical inference that the regression line does not fit well, and has zero slope, and has zero bias.

Precision Loss is also indicated if the identification event 158 was generated due to the NCUMVAR test of section V.5.3.

V.9 Equivalents

Although the foregoing details refer to particular preferred embodiments of the invention, it should be understood that the invention is not limited to these details. Substitutions and alterations, which will occur to those of ordinary skill in the art, can be made to the detailed embodiments without departing from the spirit of the invention. These modifications are intended to be within the scope of the present invention.

What is claimed is:

1. An apparatus for detecting one or more sensor faults in a measured process comprising:

A pre-processing unit for receiving a working vector of signals including measured sensor values, the preprocessing unit normalizing the measured sensor values, resulting in pre-processed sensor values;

A model unit coupled to the pre-processing unit, which converts pre-processed sensor values to equation error values that contain mainly measurement noise;

A structured residual unit coupled to the model unit, which contains a plurality of transforms, referred to as structured residual transforms, each such transform converting equation error values to a structured residual value, and each such transform designed to be insensitive to faults in a subset of sensors;

A detection unit coupled to the model unit, the detection unit monitoring the relationship among the equation error values, occurrence of a significant deviation of said relationship from expected relationship resulting in a detection event;

An identification unit coupled to the structured residual unit and the detection unit, the identification unit being activated by a detection event, and using the structured residual values to determine if one or more sensors are faulty, said determination resulting in an identification event;

An estimation unit coupled to the pre-processing unit, the structured residual unit and the identification unit, the estimation unit being activated by an identification event, and estimating fault sizes for each of the identified faulty sensors;

A replacement unit coupled to the estimation unit, the replacement unit calculating replacement values for the faulty measured sensor values in the working signal values by subtracting the estimated fault size from the corresponding measured sensor value for all identified faults;

A classification unit coupled to the estimation unit, the classification unit being active when the estimation unit is active, and classifying the identified sensor faults into a fixed set of fault types.

2. The apparatus of claim 1 wherein:

The normalizing in the pre-processing units is achieved by scaling and offsetting the measured sensor values.

3. The apparatus of claim 1 wherein:

The working signal includes known status information about the measured sensor values.

4. The apparatus of claim 1 wherein:

The converting in the model unit is achieved by multiplying the pre-processed sensor values by a matrix to produce the equation error.

5. The apparatus of claim 4 wherein:

The matrix is derived from the residual part of a principal component analysis.

6. The apparatus of claim 4 wherein:

The matrix is derived from the residual part of a set of partial least squares models, one for each sensor value.

7. The apparatus of claim 4 wherein:

The matrix is derived from mass balance or energy balance of the measured process.

8. The apparatus of claim 1 wherein:

Each transform of the structured residual unit is in the form of a vector dot product with the equation error.

9. The apparatus of claim 1 wherein:

Each transform of the structured residual unit is designed to be insensitive to faults in a subset of sensors, but maximally sensitive to faults in all other sensors not in the subset.

10. The apparatus of claim 1 wherein:

Each transform of the structured residual unit is designed to be insensitive to a fault in single sensor, but maximally sensitive to faults in all other sensors.

11. The apparatus of claim 1 wherein:

The subset of sensors defining each transform includes at least all sensors of known bad status.

12. The apparatus of claim 1 wherein the detection unit monitors the relationship among the equation error values by:

calculating a detection index which is a function of the equation errors; and comparing said detection index to a threshold in order to detect occurrence of a significant deviation of said relationship from expected relationship.

13. The apparatus of claim 12 wherein:

The detection index is obtained by summing the squared values of the equation error values.

14. The apparatus of claim 12 wherein:

The equation error is multiplied by a matrix to decorrelate the equation error values, resulting in decorrelated equation error values; and The detection index is obtained by summing the squared values of the decorrelated equation error values.

15. The apparatus of claim 12 wherein:

The threshold is determined using statistical techniques.

16. The apparatus of claim 12 wherein:

The detection index is filtered, at least according to time, in order to smooth out the effects of transients and noise, resulting in a filtered detection index; and said filtered detection index is used in place of the detection index to monitor the relationship among the equation error values; and said filtered detection is compared to a threshold in order to detect occurrence of a significant deviation of said relationship from expected relationship.

17. The apparatus of claim 16 wherein:

the detection index is filtered by applying an exponentially weighted moving average filter.

18. The apparatus of claim 17 wherein:

The threshold for the filtered detection index is calculated from the detection index threshold using an autocorrelation function.

19. The apparatus of claim 1 wherein:

The identification unit compares each structured residual value to a corresponding threshold; and An identification event occurs if the value of all but one structured residual value, referred to as the identified structured residual value, exceeds its corresponding threshold; and The determined faulty sensors are the subset of sensors for which, by design, the structured residual transform corresponding to the identified structured residual value is insensitive to the presence of faults in said subset.

20. The apparatus of claim 1 wherein the identification unit applies conversion operations to the structured residual values resulting in converted structured residual indices and The identification unit compares each converted structured residual index to a corresponding threshold; and An identification event occurs if the converted structured residual index of all but one structured residual, referred to as the identified converted structured residual index, exceeds its corresponding threshold; and The determined faulty sensors are the subset of sensors for which, by design, the structured residual transform corresponding the converted structured residual index is insensitive to the presence of faults in said subset.

21. The apparatus of claim 20 wherein:

The conversion operation includes the operations of squaring and scaling.

22. The apparatus of claim 20 wherein:

The conversion operation includes applying an exponentially weighted moving average filter in time.

23. The apparatus of claim 22 wherein:

The threshold for each converted structured residual index is calculated from the corresponding structured residual threshold using an auto-correlation function.

24. The apparatus of claim 1 wherein the identification unit applies accumulating operations to the structured residual values resulting in accumulated structured residual indices, said operations accumulating since the time of the fault detection event, and The identification unit compares each accumulated structured residual index to a corresponding threshold; and An identification event occurs if the accumulated structured residual index of all but one structured residual, referred to as the identified accumulated structured residual index, exceeds its corresponding threshold; and The determined faulty sensors are the subset of sensors for which, by design, the structured residual transform corresponding to the identified accumulated structured residual index is insensitive to the presence of faults in said subset.

25. The apparatus of claim 24 wherein:

The accumulating operation calculates a generalized likelihood ratio index that is designed to detect significant changes in the statistical mean of the structured residuals since the time of the fault detection event.

26. The apparatus of claim 24 wherein:

The accumulating operation calculates the statistical mean of the structured residuals since the time of the fault detection event, resulting in an accumulated mean index.

27. The apparatus of claim 24 wherein:

The accumulating operation calculates the statistical variance of the structured residuals since the time of the fault detection event, resulting in an accumulated variance index.

28. The apparatus of claim 1 wherein:

The estimated fault size for each of the identified sensor faults is calculated by minimizing the effect of said identified sensor faults on the equation error values.

29. The apparatus of claim 1 wherein:

The classification unit calculates a plurality of regression lines, one for each identified faulty sensor, each such regression line calculated using the measured sensor values for the corresponding faulty sensor since the time of identification, resulting in a plurality of sensor value regression lines; and The classification unit calculates a plurality of regression lines, one for each identified faulty sensor, each such regression line calculating using estimated fault sizes for the corresponding faulty sensor since the time of identification, result in a plurality of fault size regression lines; and The classification unit uses slope, bias, and residual information from sensor value regression lines and fault size regression lines to classify the identified sensor faults into a fixed set of fault types.

30. The apparatus of claim 29 wherein:

A faulty sensor is classified as type "complete failure" if the residual of the corresponding sensor value regression line is below a threshold, and if the slope of the corresponding sensor value regression line is statistically equal to zero.

31. The apparatus of claim 29 wherein:

A faulty sensor is classified as type "bias" if the residual of the corresponding fault size regression line is below a threshold, and if the slope of the corresponding fault size regression line is statistically equal to zero, and if the bias of the corresponding fault size regression line is statistically unequal to zero.

32. The apparatus of claim 29 wherein:

A faulty sensor is classified as type "drift" if the residual of the corresponding fault size regression line is below a threshold, and if the slope of the corresponding fault size regression line is statistically unequal to zero.

33. The apparatus of claim 29 wherein:

A faulty sensor is classified as type "precision loss" if the residual of the corresponding fault size regression line is above a threshold, and if the slope and bias of the corresponding fault size regression line are both statistically equal to zero.

34. The apparatus of claim 26 wherein:

A faulty sensor is classified as type "precision loss" if the identification event is triggered by an accumulated variance index exceeding its threshold.

35. A computer method for detecting one or more sensor faults in a measured process which comprises the steps:

Receiving a working vector of signals including measured sensor values, and preprocessing the measured sensor values, resulting in pre-processed sensor values;

Converting the pre-processed sensor values to equation error values that contain mainly measurement noise;

Applying a plurality of transforms to the equation error values resulting in a plurality of structured residual values, said transforms referred to as structured residual transforms and designed to be insensitive to faults in a subset of sensors;

Monitoring the relationship among the equation error values, occurrence of a significant deviation of said relationship from expected relationship resulting in a detection event;

In the case that a detection event occurs, using the structured residual values to determine if one or more sensors are faulty, said determination resulting in an identification event;

In the case that an identification event occurs, estimating fault sizes for each of the identified faulty sensors;

In the case that an identification event occurs, replacing faulty measured sensor values in the working signal with corrected values by subtracting the estimated fault size from the corresponding measured sensor value for all identified faults;

In the case that an identification event occurs, classifying the identified sensor faults into a fixed set of fault types.

36. The method of claim 35 wherein:

The step of pre-processing the measured sensor values is achieved by scaling and offsetting.

37. The method of claim 35 wherein:

The working signal includes known status information about the measured sensor values.

38. The method of claim 35 wherein:
The step of converting the pre-processed sensor values to equation error values is achieved by multiplying the preprocessed sensor values by a matrix.

39. The method of claim 38 wherein:
The matrix is derived from the residual part of a principal component analysis.

40. The method of claim 38 wherein:
The matrix is derived from the residual part of a set of partial least squares models, one for each sensor value.

41. The method of claim 38 wherein:
The matrix is derived from mass balance or energy balance of the measured process.

42. The method of claim 35 wherein:
Each structured residual transform consists of a vector of coefficients that are applied as a dot product to the equation error.

43. The method of claim 35 wherein:
Each structured residual transform is designed to be insensitive to faults in a subset of sensors, but maximally sensitive to faults in all other sensors not in the subset.

44. The method of claim 35 wherein:
Each structured residual transform is designed to be insensitive to a fault in single sensor, but maximally sensitive to faults in all other sensors.

45. The method of claim 35 wherein:
The subset of sensors defining each transform includes at least all sensors of known bad status.

46. The method of claim 35 wherein the step of monitoring the relationship among the equation error values consists of:
calculating a detection index which is a function of the equation errors; and
comparing said detection index to a threshold in order to detect occurrence of a significant deviation of said relationship from expected relationship.

47. The method of claim 46 wherein:
The detection index is obtained by summing the squared values of the equation error values.

48. The method of claim 46 wherein:
The equation error is multiplied by a matrix to decorrelate the equation error values, resulting in decorrelated equation error values; and
The detection index is obtained by summing the squared values of the decorrelated equation error values.

49. The method of claim 47 or claim 48 wherein:
The threshold is determined using statistical techniques.

50. The method of claim 47 or claim 48 wherein:
The detection index is filtered, at least according to time, in order to smooth out the effects of transients and noise, resulting in a filtered detection index; and
said filtered detection index is used in place of the detection index to monitor the relationship among the equation error values; and
said filtered detection is compared to a threshold in order to detect occurrence of a significant deviation of said relationship from expected relationship.

51. The method of claim 50 wherein:
the detection index is filtered by applying an exponentially weighted moving average filter.

52. The method of claim 51 wherein:
The threshold for the filtered detection index is calculated from the detection index threshold using an auto-correlation function.

53. The method of claim 35 wherein the step of determining if one or more sensors are faulty consists of:
Comparing each structured residual value to a corresponding threshold; and
Generating an identification event if the value of all but one structured residual value, referred to as the identified structured residual value, exceeds its corresponding threshold; and
Determining that the faulty sensors are the subset of sensors for which, by design, the structured residual transform corresponding to the identified structured residual value is insensitive to the presence of faults in said subset.

54. The method of claim 35 wherein conversion operations are applied to the structured residual values resulting in converted structured residual indices and the step of determining if one or more sensors are faulty consists of:
Comparing each converted structured residual index to a corresponding threshold; and
Generating an identification event if the converted structured residual index of all but one structured residual, referred to as the identified converted structured residual index, exceeds its corresponding threshold; and
Determining that the faulty sensors are the subset of sensors for which, by design, the structured residual transform corresponding the converted structured residual index is insensitive to the presence of faults in said subset.

55. The method of claim 54 wherein:
The conversion operation includes the operations of squaring and scaling.

56. The method of claim 54 wherein:
The conversion operation includes applying an exponentially weighted moving average filter in time.

57. The method of claim 56 wherein:
The threshold for each converted structured residual index is calculated from the corresponding structured residual threshold using an auto-correlation function.

58. The method of claim 35 wherein accumulating operations are applied to the structured residual values resulting in accumulated structured residual indices, said operations accumulating since the time of the fault detection event, and the step of determining if one or more sensors are faulty consists of:
Comparing each accumulated structured residual index to a corresponding threshold; and
Generating an identification event if the accumulated structured residual index of all but one structured residual, referred to as the identified accumulated structured residual index, exceeds its corresponding threshold; and
Determining that the faulty sensors are the subset of sensors for which, by design, the structured residual transform corresponding to the identified accumulated structured residual index is insensitive to the presence of faults in said subset.

59. The method of claim 58 wherein:
The accumulating operation calculates a generalized likelihood ratio index that is designed to detect significant changes in the statistical mean of the structured residuals since the time of the fault detection event.

60. The method of claim 58 wherein:
The accumulating operation calculates the statistical mean of the structured residuals since the time of the fault detection event, resulting in an accumulated mean index.

61. The method of claim 58 wherein:

The accumulating operation calculates the statistical variance of the structured residuals since the time of the fault detection event, resulting in an accumulated variance index.

62. The method of claim 35 wherein:

The estimated fault size for each of the identified sensor faults is calculated by minimizing the effect of said identified sensor faults on the equation error values.

63. The method of claim 35 wherein the step classifying the identified sensor faults into a fixed set of fault types is achieved by:

Calculating a plurality of regression lines, one for each identified faulty sensor, each such regression line calculated using the measured sensor values for the corresponding faulty sensor from the time of identification, resulting in a plurality of sensor value regression lines; and Calculating a plurality of regression lines, one for each identified faulty sensor, each such regression line calculated using estimated fault sizes for the corresponding faulty sensor from the time of identification, result in a plurality of fault size regression lines; and Using slope, bias, and residual information from sensor value regression lines and fault size regression lines to classify the identified sensor faults into a fixed set of fault types.

64. The method of claim 63 wherein:

A faulty sensor is classified as type "complete failure" if the residual of the corresponding sensor value regression line is below a threshold, and if the slope of the corresponding sensor value regression line is statistically equal to zero.

65. The method of claim 63 wherein:

A faulty sensor is classified as type "bias" if the residual of the corresponding fault size regression line is below a threshold, and if the slope of the corresponding fault size regression line is statistically equal to zero, and if the bias of the corresponding fault size regression line is statistically unequal to zero.

66. The method of claim 63 wherein:

A faulty sensor is classified as type "drift" if the residual of the corresponding fault size regression line is below a threshold, and if the slope of the corresponding fault size regression line is statistically unequal to zero.

67. The method of claim 63 wherein:

A faulty sensor is classified as type "precision loss" if the residual of the corresponding fault size regression line is above a threshold, and if the slope and bias of the corresponding fault size regression line are both statistically equal to zero.

68. The method of claim 60 wherein:

A faulty sensor is classified as type "precision loss" if the identification event is triggered by an accumulated variance index exceeding its threshold.

* * * * *